US011189032B2

United States Patent
Ma et al.

(10) Patent No.: US 11,189,032 B2
(45) Date of Patent: Nov. 30, 2021

(54) METHOD AND APPARATUS FOR EXTRACTING A SATELLITE IMAGE-BASED BUILDING FOOTPRINT

(71) Applicant: HERE Global B.V., Eindhoven (NL)

(72) Inventors: Di Ma, Chicago, IL (US); Lin Gan, Champaign, IL (US); Fangzhou Xiong, Chicago, IL (US); Sanjay Boddhu, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 16/837,747

(22) Filed: Apr. 1, 2020

(65) Prior Publication Data

US 2021/0312632 A1  Oct. 7, 2021

(51) Int. Cl.
   *G06K 9/00*  (2006.01)
   *G06T 7/12*  (2017.01)
   *G06K 9/46*  (2006.01)
   *G06T 7/13*  (2017.01)

(52) U.S. Cl.
   CPC .............. *G06T 7/12* (2017.01); *G06K 9/4604* (2013.01); *G06T 7/13* (2017.01); *G06T 2207/10032* (2013.01); *G06T 2207/30184* (2013.01)

(58) Field of Classification Search
   None
   See application file for complete search history.

(56) References Cited

U.S. PATENT DOCUMENTS

| | | | |
|---|---|---|---|
| 9,070,018 B1 | 6/2015 | Ciarcia et al. | |
| 9,396,583 B2 * | 7/2016 | Barthelet | G06T 7/75 |
| 10,127,670 B2 | 11/2018 | Lewis et al. | |
| 10,504,283 B2 * | 12/2019 | Wu | G06T 17/10 |
| 10,984,507 B2 * | 4/2021 | Deskevich | G06T 5/002 |
| 2017/0076438 A1 | 3/2017 | Kottenstette et al. | |

OTHER PUBLICATIONS

Köhn et al., "Automatic building extraction and roof reconstruction in 3K imagery based on line segments" (Year: 2016).*
Bittner et al., "Building footprint extraction from VHR remote sensing images combined with normalized DSMs using fused fully convolutional networks", (Year: 2018).*
Dai et al., "Building segmentation and outline extraction from UAV image-derived point clouds by a line growing algorithm", (Year: 2017).*

(Continued)

*Primary Examiner* — Soo Jin Park
(74) *Attorney, Agent, or Firm* — Alston & Bird LLP

(57) ABSTRACT

A method, apparatus and computer program product are provided for extracting building footprints for buildings based on satellite imagery. In this regard, a segmentation map is generated by performing an image segmentation on satellite imagery depicting at least one building. A plurality of line segments that correspond to edges of the at least one building are also generated. Furthermore, a contour for each of the at least one building is generated by filtering line segments corresponding to the at least one building based on the respective principle direction. The geographic data for each of the at least one building is then extracted based on the respective contour.

20 Claims, 13 Drawing Sheets

(56) References Cited

OTHER PUBLICATIONS

Li et al., "An integrated system on large scale building extraction from DSM", (Year: 2010).*

Li et al., "Semantic segmentation-based building footprint extraction using very high-resolution satellite images and multi-source GIS data" (Year: 2019).*

Li et al., "Building footprint generation by integrating convolution neural network with feature pairwise conditional random field (FPCRF)" (Year: 2019).*

Baluyan, H. et al., *Novel Approach for Rooftop Detection Using Support Vector Machine*, ISRN Machine Vision, vol. 2013, Article ID 819768 (Dec. 2013) 13 pages.

Chen, L-C. et al., *Encoder-Decoder With Atrous Separable Convolution for Semantic Image Segmentation*, arXiv:1802.02611v3 (Aug. 22, 2018) 18 pages.

Ghosh, W. et al., *Understanding Deep Learning Techniques for Image Segmentation*, arXiv:1907.06119v1 (Jul. 16, 2019) 58 pages.

Kohn, A. et al., *Automatic Building Extraction and Roof Reconstruction in 3K Imagery Based on Line Segments*, The International Archives of the Photogrammetry, Remote Sensing and Spatial Information Sciences, vol. XLI-B3 (2016) pp. 265-631.

Samel, K. et al., *Active Deep Learning to Tune Down the Noise in Labels*, Aplied Data Science Track Paper, KDD (Aug. 2018) 685-694.

GitHub—Microsoft/USBuildingFootprints: Computer generated building footprints for the United States [online] [retrieved Jul. 2, 2020]. Retrieved via the Internet: https://web.archive.org/web/20200313032451/https://github.com/Microsoft/USBuildingFootprints (dated Mar. 13, 2020) 6 pages.

SpaceNet [online] [retrieved Jul. 2, 2020]. Retrieved via the Internet: https://web.archive.org/web/20200315154120/https://spacenetchallenge.github.io/ (dated Mar. 15, 2020) 3 pages.

Digibati—Extracting building from single imagery | Gaiddon Software [online] [retrieved Jul. 2, 2020]. Retrieved via the Internet: https://web.archive.org/web/20191225180532/http://www.gaiddon-software.com/en/digibati/ (dated Dec. 25, 2019) 8 pages.

Ecopia—Global Feature Extraction [online] [retrieved Jul. 6, 2020]. Retrieved via the Internet: https://www.ecopiatech.com/global-feature-extraction (2018) 6 pages.

Extended European Search Report for European Application No. 21166302.6 dated Aug. 11, 2021, 12 pages.

Kelly et al., "Simplifying Urban Data Fusion with BigSUR", arXiv: 1807.00687, (Jul. 2, 2018), 13 pages.

Lee et al., "Extraction and Regularization of Various Building Boundaries with Complex Shapes Utilizing Distribution Characteristics of Airborne LIDAR Points", ETRI Journal, vol. 33, No. 4, (Aug. 2011), pp. 547-557.

Turker et al., "Building Extraction from High-Resolution Optical Spacebome Images Using the Integration of Support Vector Machine (SVM) Classification, Hough Transformation and Perceptual Grouping", International Journal of Applied Earth Observation and Geoinformation, vol. 34, (Jul. 24, 2014), pp. 58-69.

Zhang et al., "Semiautomatic Right-Angle Building Extraction from Very High-Resolution Aerial Images Using Graph Cuts with Star Shape Constraint and Regularization", Journal of Applied Remote Sensing 12(2), (Apr. 2018), 15 pages.

* cited by examiner

METHOD AND APPARATUS FOR EXTRACTING A SATELLITE IMAGE-BASED BUILDING FOOTPRINT

TECHNOLOGICAL FIELD

An example embodiment of the present invention relates to image segmentation and, more particularly, to a method, apparatus and computer program product for satellite image-based building footprint extraction.

BACKGROUND

Producing two-dimensional (2D) building footprints from satellite imagery generally involves manual identification of buildings in the satellite imagery by a user and/or manual segmentation of buildings in the satellite imagery by a user. For instance, a graphical user interface (GUI) can be employed by a user to analyze satellite imagery and manually draw building contours relative to the satellite imagery via the GUI. However, manually identifying and/or segmenting buildings in satellite imagery via a GUI can be difficult and/or time consuming. Furthermore, manually identifying and/or segmenting buildings in satellite imagery via a GUI can result in inaccurate identification and/or segmentation of buildings, often leading to further challenges for producing 2D building footprints.

BRIEF SUMMARY

A method, apparatus and computer program product are provided in order to extract geographic data for buildings from satellite imagery. The method, apparatus and computer program product of an example embodiment are configured to extract the geographic data using one or more image processing techniques and/or one or more deep learning techniques, thereby providing an automated tool to extract the geographic data from the satellite imagery. Additionally, the method, apparatus and computer program product of an example embodiment are configured to detect the buildings in the satellite imagery and/or estimate contours of the buildings using the one or more image processing techniques and/or one or more deep learning techniques. As such, accuracy of the geographic data for the buildings can be improved. Furthermore, an amount of time to determine the geographic data for the buildings can be reduced. Efficiency and/or performance of a processor, both in terms of building identification and in subsequent use of building information, can also be improved by employing the one or more image processing techniques and/or one or more deep learning techniques disclosed herein.

In an example embodiment, a method is provided for extracting building footprints for buildings based on satellite imagery. The method includes generating a segmentation map by performing an image segmentation on satellite imagery depicting at least one building. The method also includes generating a plurality of line segments that correspond to edges of the at least one building. The method also includes, for each of the at least one building, identifying a line segment that defines a principal direction of the respective building. Furthermore, the method includes generating a contour for each of the at least one building by filtering line segments corresponding to the at least one building based on the respective principal direction. The method also includes extracting the geographic data for each of the at least one building based on the respective contour.

The method of an example embodiment also includes identifying the line segment based on a maximum length of the plurality of line segments. The method of an example embodiment also includes identifying the line segment based on a line segment detection technique. The method of another example embodiment includes rotating an image of the at least one building based on the principal direction of the at least one building to provide a rotated version of the image of the at least one building. In this example embodiment, the method also includes locating a raw contour for each of the at least one building based on the rotated version of the image of the at least one building. Furthermore, in this example embodiment, the method includes refining the raw contour for each of the at least one building to generate the contour for each of the at least one building.

The method of another example embodiment includes applying a filter associated with a probability distribution to the segmentation map to generate a processed segmentation map. In this example embodiment, the generating the contour for each of the at least one building comprises locating a raw contour for each of the at least one building based on the processed segmentation map, and refining the raw contour for each of the at least one building to generate the contour for each of the at least one building. The method of another example embodiment includes refining a raw contour for each of the at least one building by removing one or more line segments of the raw contour. In this example embodiment, the method also includes connecting one or more other line segments of the raw contour to form the contour for each of the at least one building.

The method of another example embodiment includes smoothing at least one rasterized pattern from a raw contour for each of the at least one building. Additionally, the method of yet another example embodiment includes clustering line segments of a raw contour for each of the at least one building based on respective directions of alignment associated with the line segments. The method of yet another example embodiment includes merging two or more line segments of a raw contour for each of the at least one building to generate a principal cluster of line segments.

The method of another example embodiment includes training a machine learning model for the image segmentation based on a noisy machine learning model of building contours that facilitates selection of a subset of satellite imagery as input training data for a next iteration of the training for the machine learning model. The method of yet another example embodiment includes refining the segmentation map to generate a binary mask associated with a location for each of the at least one building in the satellite imagery. The method of yet another example embodiment includes refining the segmentation map based on a watershed image processing technique to facilitate identification of a location for each of the at least one building.

In another example embodiment, an apparatus is provided that is configured to extract building footprints for buildings based on satellite imagery. The apparatus includes processing circuitry and at least one memory including computer program code instructions that are configured to, when executed by the processing circuitry, cause the apparatus to generate a segmentation map by performing an image segmentation on satellite imagery depicting at least one building. The computer program code instructions are also configured to, when executed by the processing circuitry, cause the apparatus to generate a plurality of line segments that correspond to edges of the at least one building. The computer program code instructions are also configured to, when executed by the processing circuitry, cause the apparatus to, for each of the at least one building, identify a line segment that defines a principal direction of the respective building. The computer program code instructions are further configured to, when executed by the processing circuitry, cause the apparatus to generate a contour for each of the at least one building by filtering line segments corresponding to the at least one building based on the respective principal direction. The computer program code instructions are further configured to, when executed by the processing circuitry, cause the apparatus to extract the geographic data for each of the at least one building based on the respective contour.

The computer program code instructions are further configured to, when executed by the processing circuitry, cause the apparatus of an example embodiment to rotate an image of the at least one building based on the principal direction of the at least one building to provide a rotated version of the image of the at least one building. The computer program code instructions are further configured to, when executed by the processing circuitry, cause the apparatus of an example embodiment to locate a raw contour for each of the at least one building based on the rotated version of the image of the at least one building. The computer program code instructions are further configured to, when executed by the processing circuitry, cause the apparatus of an example embodiment to smooth at least one rasterized pattern from the raw contour for each of the at least one building. The computer program code instructions are further configured to, when executed by the processing circuitry, cause the apparatus of an example embodiment to cluster line segments of the raw contour based on respective directions of alignment associated with the line segments. The computer program code instructions are further configured to, when executed by the processing circuitry, cause the apparatus of an example embodiment to merge two or more line segments of the raw contour to generate a principal cluster of line segments.

The computer program code instructions are further configured to, when executed by the processing circuitry, cause the apparatus of an example embodiment to train a machine learning model for the image segmentation based on a noisy machine learning model of building contours that facilitates selection of a subset of satellite imagery as input training data for a next iteration of the training for the machine learning model. The computer program code instructions are further configured to, when executed by the processing circuitry, cause the apparatus of an example embodiment to refine the segmentation map to generate a binary mask associated with a location for each of the at least one building in the satellite imagery. The computer program code instructions are further configured to, when executed by the processing circuitry, cause the apparatus of an example embodiment to refine the segmentation map based on a watershed image processing technique to facilitate identification of a location for each of the at least one building.

In another example embodiment, a computer program product is provided for extracting building footprints for buildings based on satellite imagery. The computer program product includes at least one non-transitory computer readable storage medium having computer-executable program code instructions stored therein with the computer-executable program code instructions including program code instructions configured, upon execution, to perform image segmentation of satellite imagery to generate a segmentation map that indicates a location for at least one building in the satellite imagery. The program code instructions are also configured to identify a line segment representative of a portion of the at least one building that satisfies a defined criterion associated with length to determine a principal direction of the at least one building. Furthermore, the program code instructions are configured to generate a contour for each of the at least one building based on the principal direction of the at least one building. The program code instructions are also configured to extract the geographic data for each of the at least one building based on the contour for each of the at least one building.

The program code instructions of an example embodiment are also configured to identify the line segment based on a line segment detection technique. The program code instructions of another example embodiment are configured to rotate an image of the at least one building based on the principal direction of the at least one building to provide a rotated version of the image of the at least one building. In this example embodiment, the program code instructions are additionally configured to locate a raw contour for each of the at least one building based on the rotated version of the image of the at least one building. Furthermore, in this example embodiment, the program code instructions ae configured to refine the raw contour for each of the at least one building to generate the contour for each of the at least one building.

The program code instructions of another example embodiment are configured to apply a filter associated with a probability distribution to the segmentation map to generate a processed segmentation map. In this example embodiment, the program code instructions configured to generate the contour for each of the at least one building include program code instructions configured to locate a raw contour for each of the at least one building based on the processed segmentation map, and program code instructions configured to refine the raw contour for each of the at least one building to generate the contour for each of the at least one building. The program code instructions of another example embodiment are also configured to refine a raw contour for each of the at least one building by removing one or more line segments of the raw contour. In this example embodiment, the program code instructions are additionally configured to connect one or more other line segments of the raw contour to form the contour for each of the at least one building.

The program code instructions of another example embodiment are also configured to smooth at least one rasterized pattern from a raw contour for each of the at least one building. Additionally, the program code instructions of yet another example embodiment are configured to cluster line segments of a raw contour for each of the at least one building based on respective directions of alignment associated with the line segments. The program code instructions of yet another example embodiment are additionally configured to merge two or more line segments of a raw contour for each of the at least one building to generate a principal cluster of line segments.

The program code instructions of another example embodiment are configured to train a machine learning model for the image segmentation based on a noisy machine learning model of building contours that facilitates selection of a subset of satellite imagery as input training data for a next iteration of the training for the machine learning model. The program code instructions of yet another example embodiment are configured to refine the segmentation map to generate a binary mask associated with a location for each of the at least one building in the satellite imagery. The program code instructions of yet another example embodiment are additionally configured to refine the segmentation map based on a watershed image processing technique to facilitate identification of a location for each of the at least one building.

The apparatus of an example embodiment also includes means for generating a segmentation map by performing an image segmentation on satellite imagery depicting at least one building. The apparatus of an example embodiment also includes means for generating a plurality of line segments that correspond to edges of the at least one building. The apparatus of an example embodiment also includes, for each of the at least one building, means for identifying a line segment that defines a principal direction of the respective building. The apparatus of an example embodiment also includes means for generating a contour for each of the at least one building by filtering line segments corresponding to the at least one building based on the respective principal direction. Furthermore, the apparatus of an example embodiment also includes means for extracting the geographic data for each of the at least one building based on the respective contour.

The means for identifying the line segment in an example embodiment comprises means for identifying the line segment based on a maximum length of the plurality of line segments. The means for identifying the line segment in an example embodiment comprises means for identifying the line segment based on a line segment detection technique. The apparatus of an example embodiment also includes means for rotating an image of the at least one building based on the principal direction of the at least one building to provide a rotated version of the image of the at least one building. In this example embodiment, the apparatus also includes means for locating a raw contour for each of the at least one building based on the rotated version of the image of the at least one building. Furthermore, in this example embodiment, the apparatus also includes means for refining the raw contour for each of the at least one building to generate the contour for each of the at least one building.

The apparatus of an example embodiment also includes means for applying a filter associated with a probability distribution to the segmentation map to generate a processed segmentation map. In this example embodiment, the means for generating the contour for each of the at least one building comprises means for locating a raw contour for each of the at least one building based on the processed segmentation map, and means for refining the raw contour for each of the at least one building to generate the contour for each of the at least one building. The apparatus of an example embodiment also includes means for refining a raw contour for each of the at least one building by removing one or more line segments of the raw contour. In this example embodiment, the apparatus also includes means for connecting one or more other line segments of the raw contour to form the contour for each of the at least one building.

The apparatus of an example embodiment also includes means for smoothing at least one rasterized pattern from a raw contour for each of the at least one building. Additionally, the apparatus of an example embodiment also includes means for clustering line segments of a raw contour for each of the at least one building based on respective directions of alignment associated with the line segments. The apparatus of an example embodiment also includes means for merging two or more line segments of a raw contour for each of the at least one building to generate a principal cluster of line segments.

The apparatus of an example embodiment also includes means for training a machine learning model for the image segmentation based on a noisy machine learning model of building contours that facilitates selection of a subset of satellite imagery as input training data for a next iteration of the training for the machine learning model. The apparatus of an example embodiment also includes means for refining the segmentation map to generate a binary mask associated with a location for each of the at least one building in the satellite imagery. The apparatus of an example embodiment also includes means for refining the segmentation map based on a watershed image processing technique to facilitate identification of a location for each of the at least one building.

In yet another example embodiment, a method is provided for extracting building footprints for buildings based on satellite imagery. The method includes generating a segmentation map by performing an image segmentation on satellite imagery depicting at least one building. The method also includes estimating a raw contour for each of the at least one building based on the segmentation map. Furthermore, the method includes clustering line segments of the raw contour to generate a refined contour for each of the at least one building. The method also includes extracting the geographic data for each of the at least one building based on the refined contour for each of the at least one building.

The method of an example embodiment also includes clustering the line segments of the raw contour based on respective directions of alignment associated with the line segments. The method of an example embodiment also includes merging two or more line segments of the raw contour.

In another example embodiment, an apparatus is provided that is configured to extract building footprints for buildings based on satellite imagery. The apparatus includes processing circuitry and at least one memory including computer program code instructions that are configured to, when executed by the processing circuitry, cause the apparatus to generate a segmentation map by performing an image segmentation on satellite imagery depicting at least one building. The computer program code instructions are also configured to, when executed by the processing circuitry, cause the apparatus to estimate a raw contour for each of the at least one building based on the segmentation map. The computer program code instructions are further configured to, when executed by the processing circuitry, cause the apparatus to cluster line segments of the raw contour to generate a refined contour for each of the at least one building. The computer program code instructions are further configured to, when executed by the processing circuitry, cause the apparatus to extract the geographic data for each of the at least one building based on the refined contour for each of the at least one building.

The computer program code instructions are also configured to, when executed by the processing circuitry, cause the apparatus to cluster the line segments of the raw contour based on respective directions of alignment associated with the line segments. The computer program code instructions are also configured to, when executed by the processing circuitry, cause the apparatus to merge two or more line segments of the raw contour.

In another example embodiment, a computer program product is provided for extracting building footprints for buildings based on satellite imagery. The computer program product includes at least one non-transitory computer readable storage medium having computer-executable program code instructions stored therein with the computer-executable program code instructions including program code instructions configured, upon execution, to generate a segmentation map by performing an image segmentation on satellite imagery depicting at least one building. The program code instructions are also configured to estimate a raw contour for each of the at least one building based on the segmentation map. Furthermore, the program code instructions are configured to cluster line segments of the raw contour to generate a refined contour for each of the at least one building. The program code instructions are further configured to extract the geographic data for each of the at least one building based on the refined contour for each of the at least one building.

The program code instructions of an example embodiment are also configured to cluster the line segments of the raw contour based on respective directions of alignment associated with the line segments. The program code instructions of an example embodiment are additionally configured to merge two or more line segments of the raw contour.

The apparatus of an example embodiment also includes means for generating a segmentation map by performing an image segmentation on satellite imagery depicting at least one building. The apparatus of an example embodiment also includes means for estimating a raw contour for each of the at least one building based on the segmentation map. The apparatus of an example embodiment also includes means for clustering line segments of the raw contour to generate a refined contour for each of the at least one building. Furthermore, the apparatus of an example embodiment also includes means for extracting the geographic data for each of the at least one building based on the refined contour for each of the at least one building.

The apparatus of an example embodiment also includes means for clustering the line segments of the raw contour based on respective directions of alignment associated with the line segments. The apparatus of an example embodiment also includes means for merging two or more line segments of the raw contour.

BRIEF DESCRIPTION OF THE DRAWINGS

Figure 1:
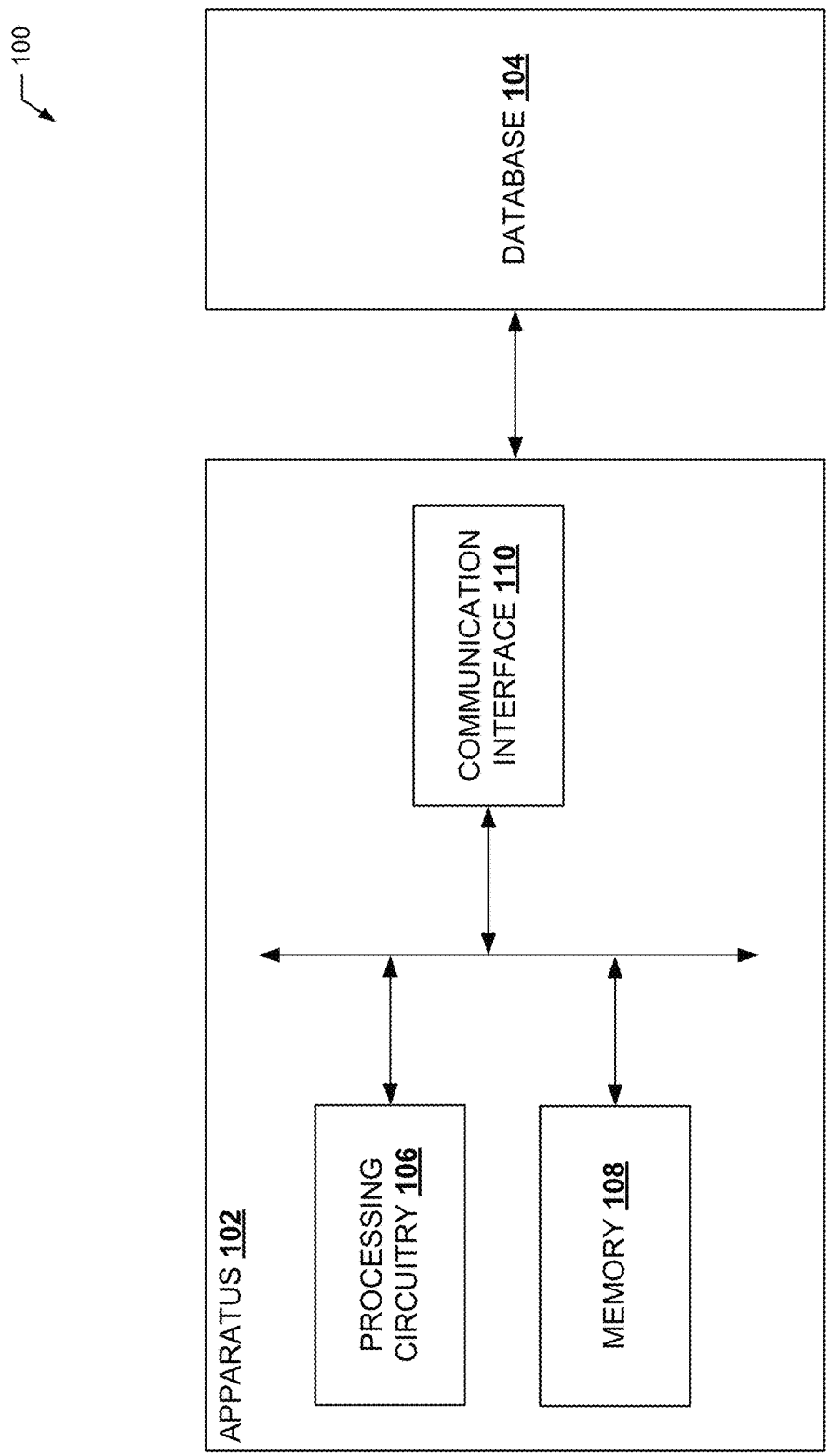
Figure 2:
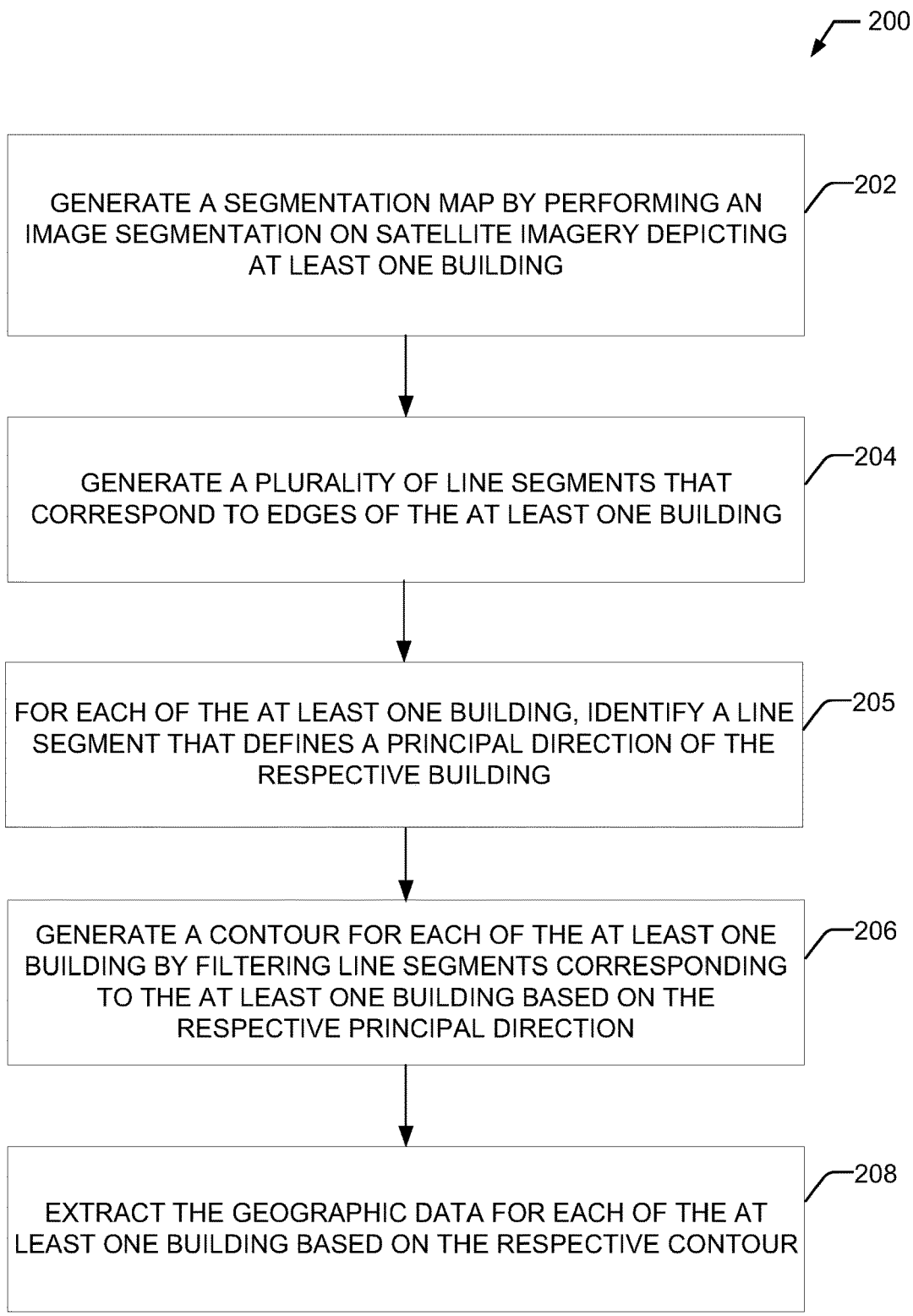
Figure 3:
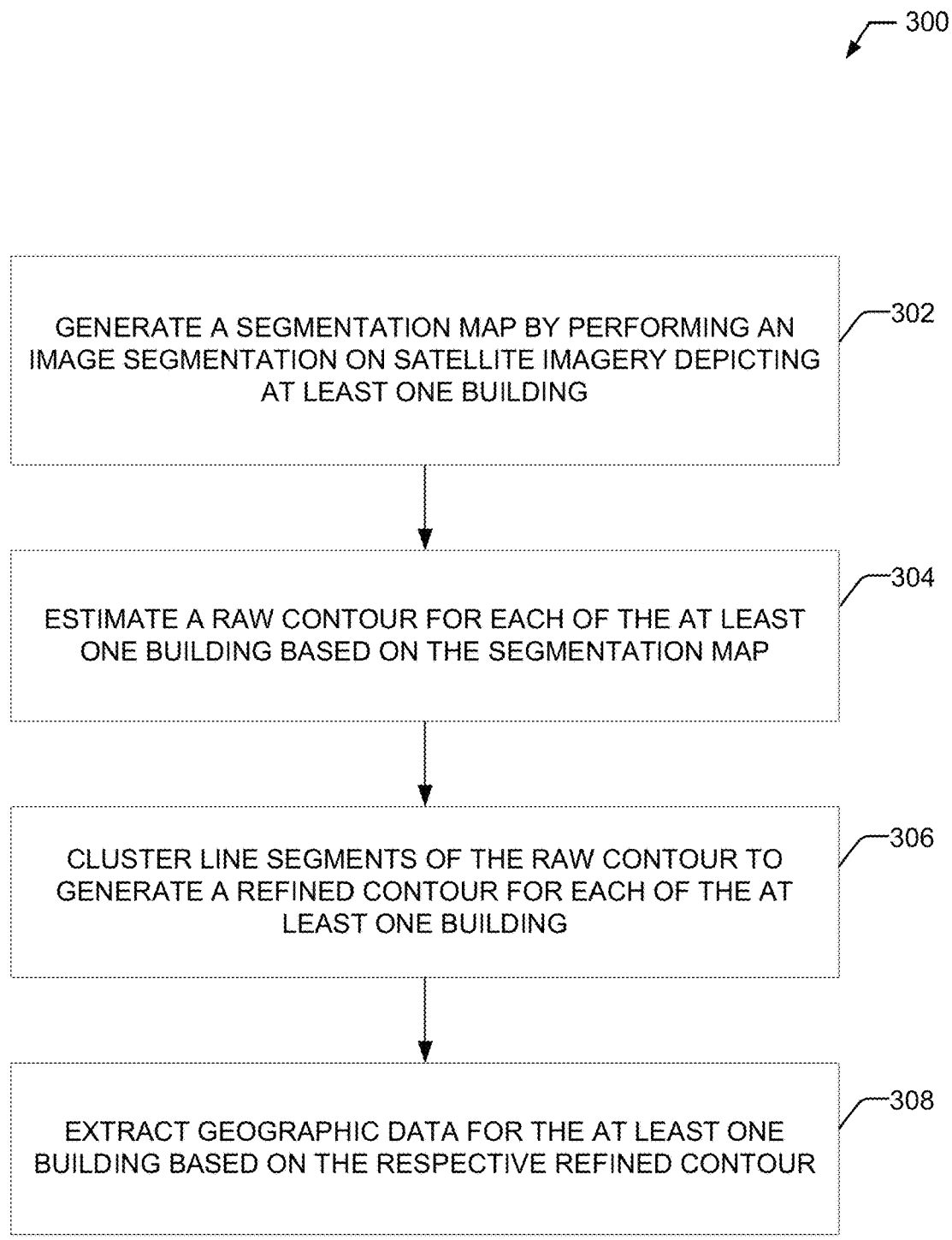
Figure 4:
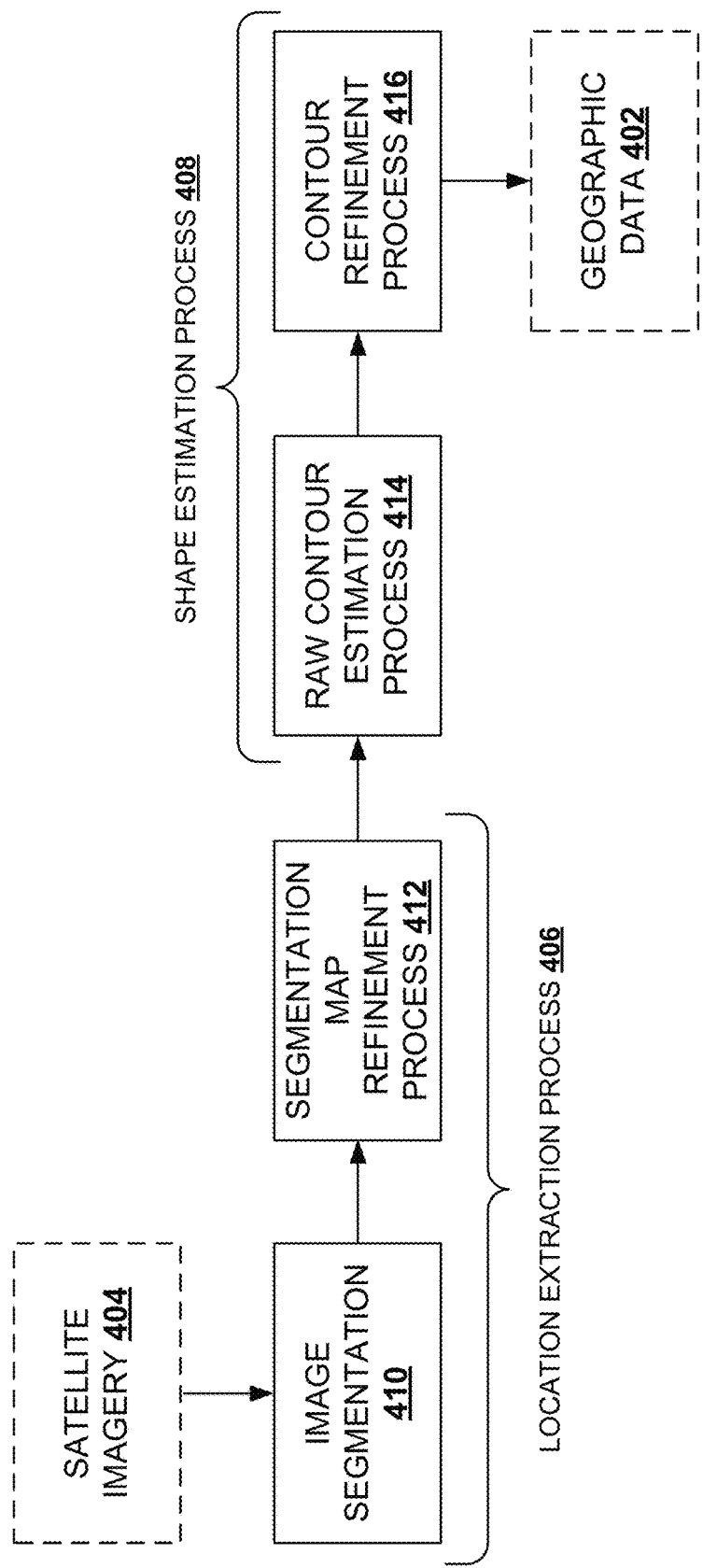
Figure 5:
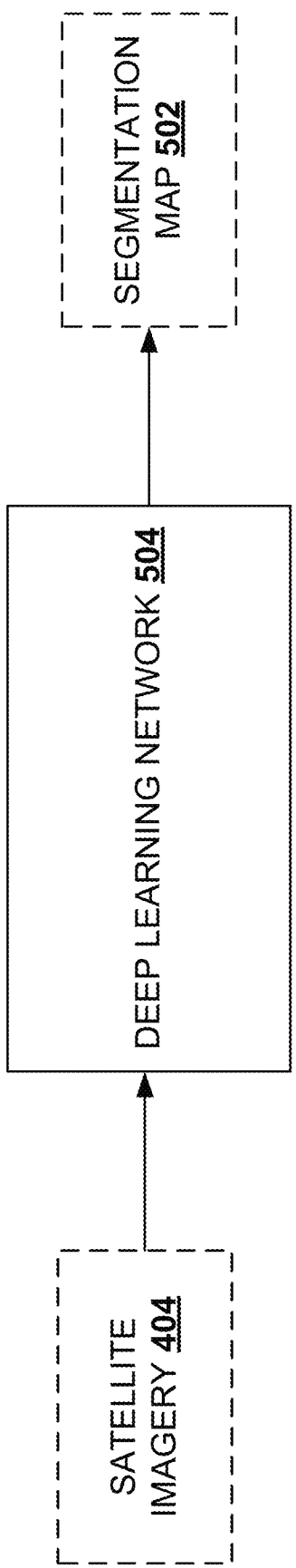
Figure 6:
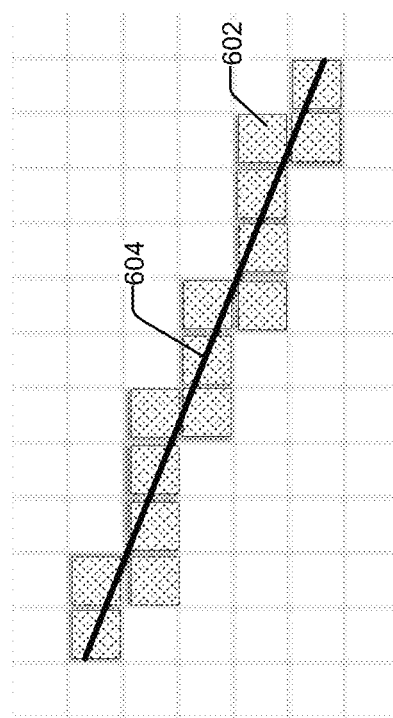
Figure 7:
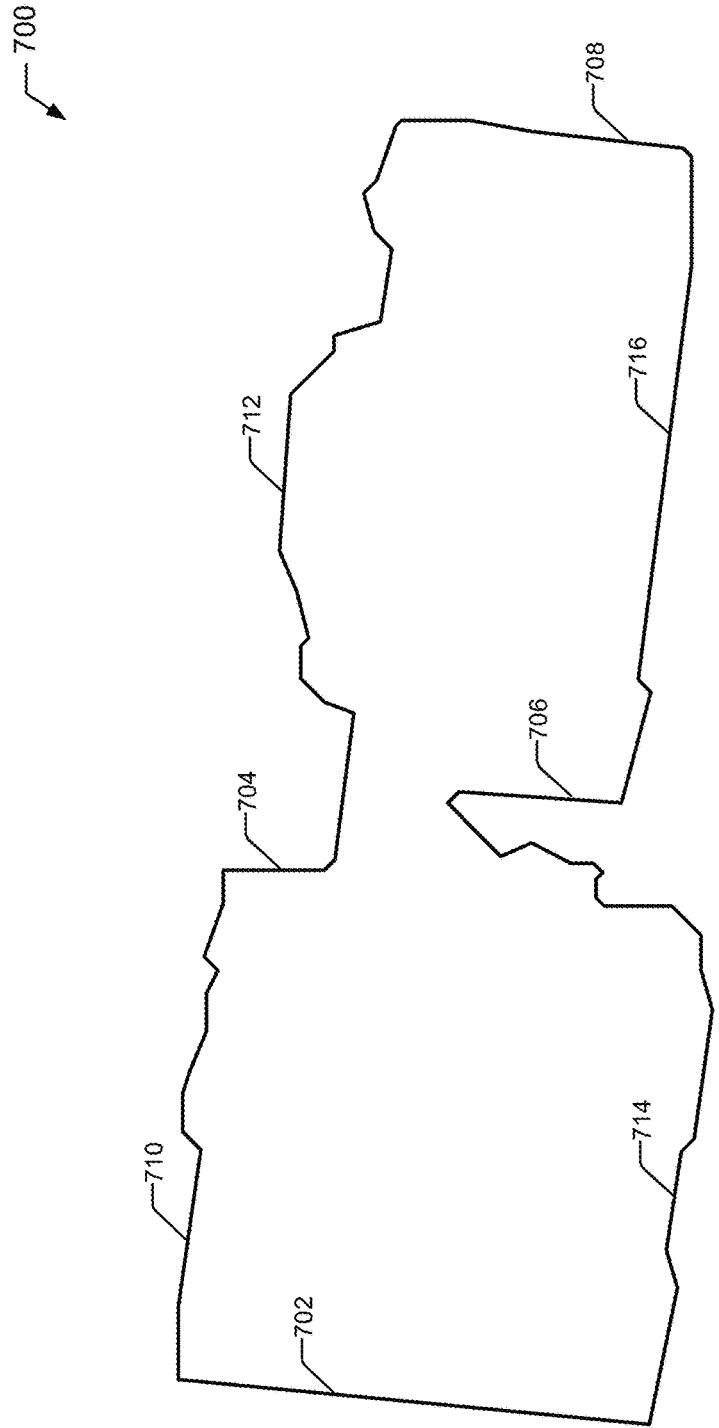
Figure 8:
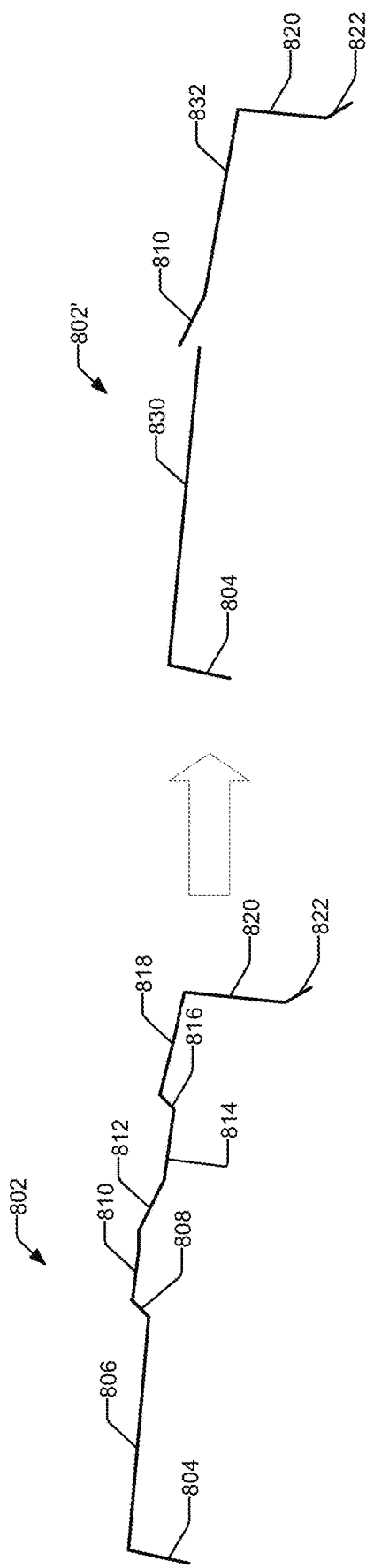
Figure 9:
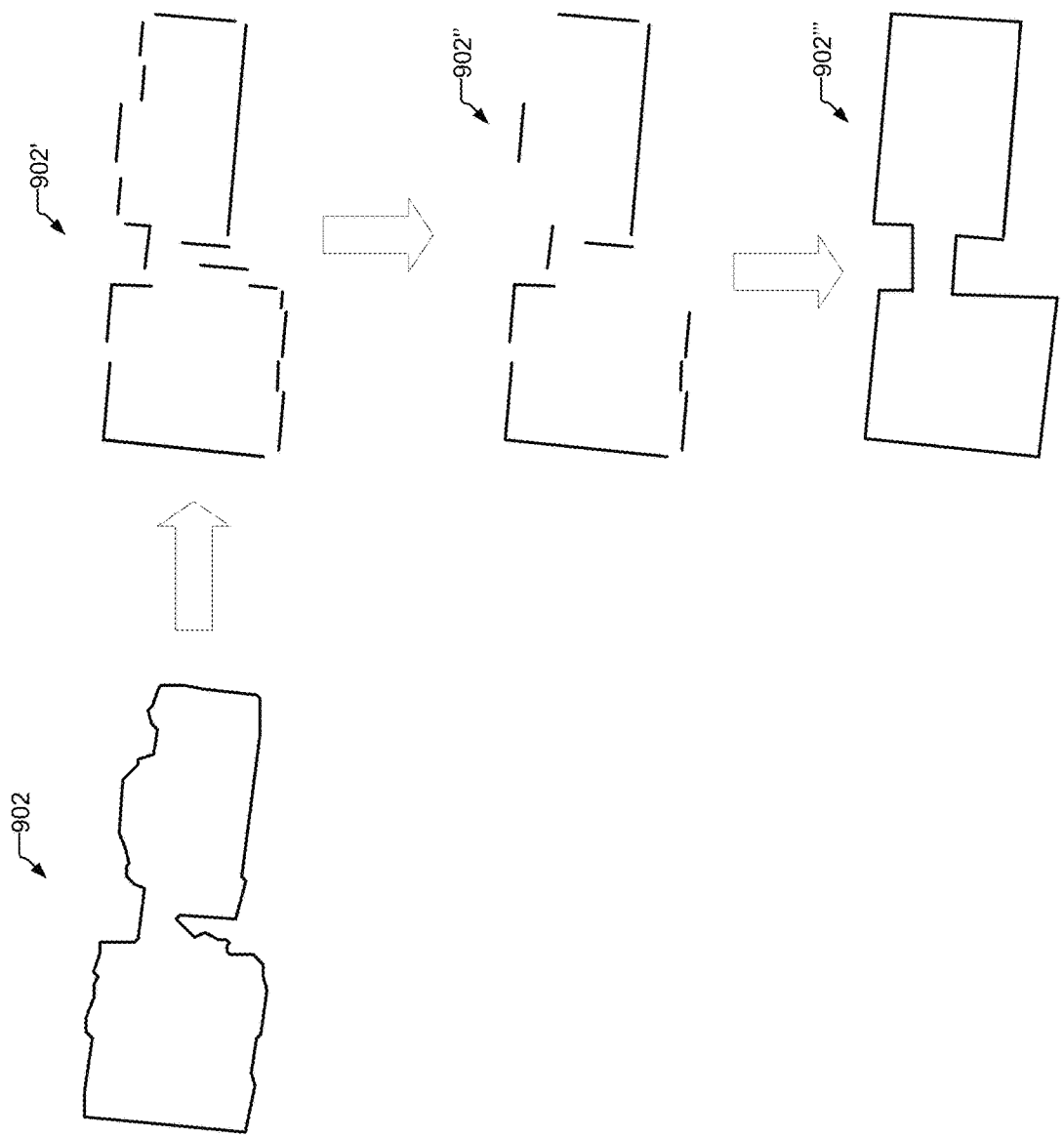
Figure 10:
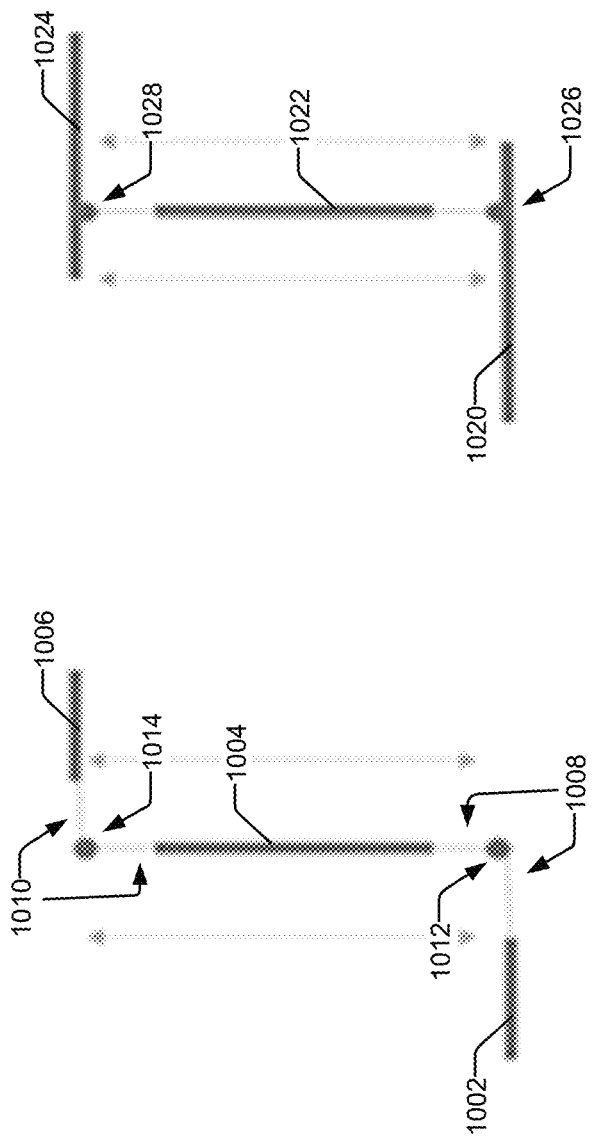
Figure 11:
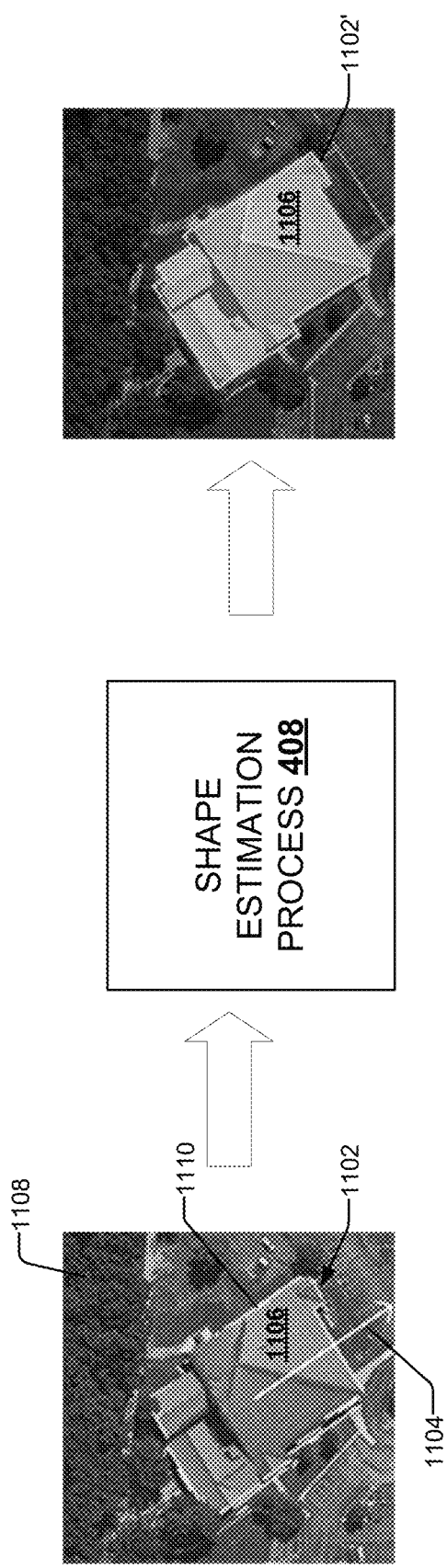
Figure 12:
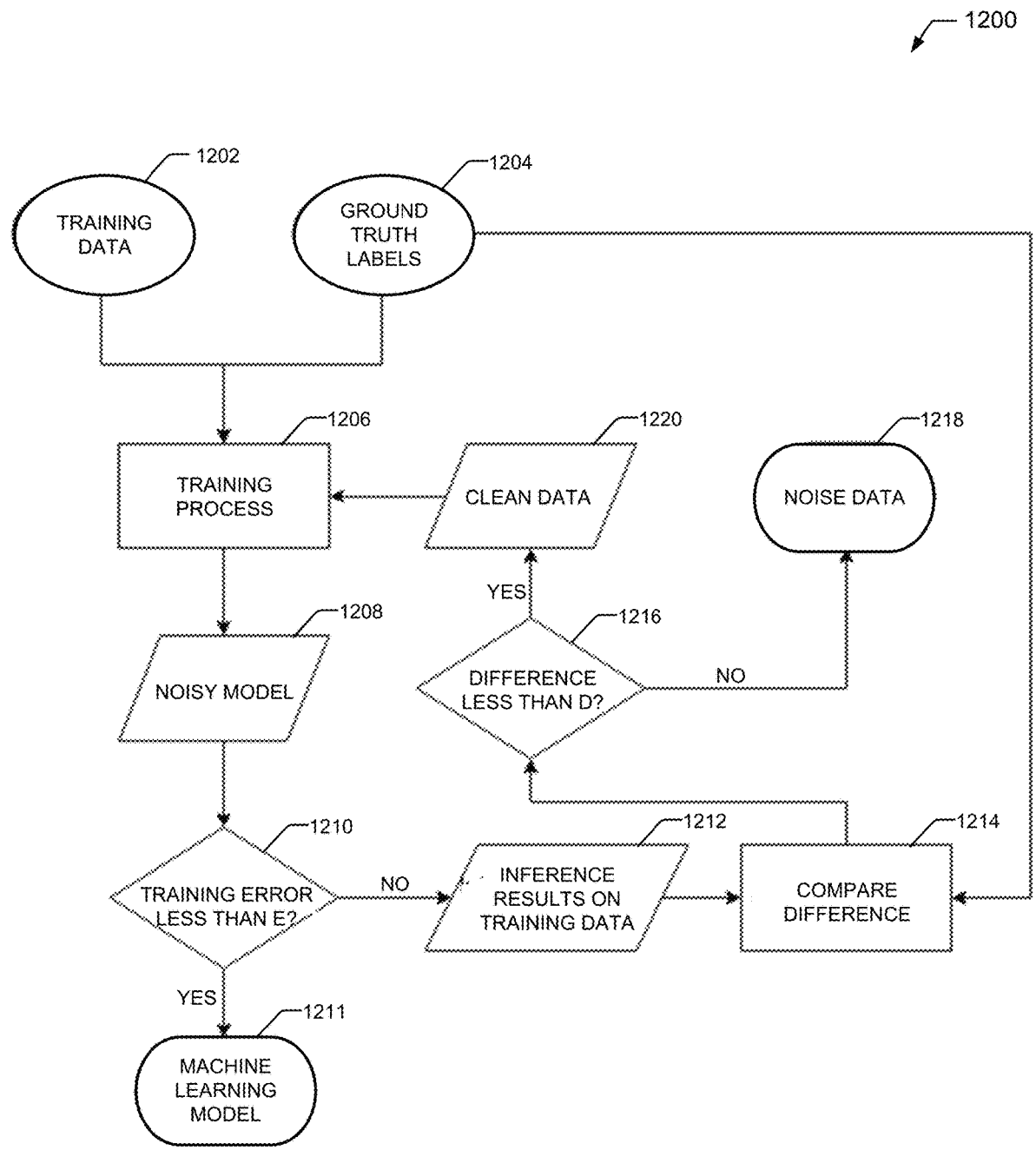
Figure 13:
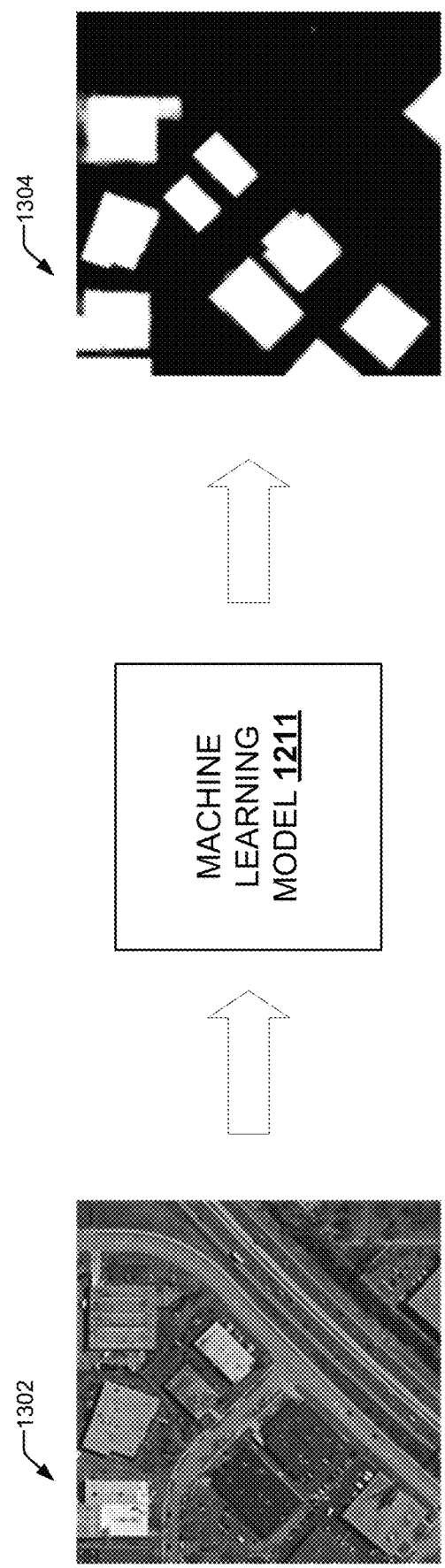

Having thus described certain embodiments of the invention in general terms, reference will now be made to the accompanying drawings, which are not necessarily drawn to scale, and wherein:

FIG. 1 is a block diagram of a system for extracting building footprints for buildings based on satellite imagery by an apparatus in accordance with one or more example embodiments of the present disclosure;

FIG. 2 is a flowchart illustrating operations performed, such as by the apparatus of FIG. 1, in order to extract geographic data for buildings in satellite imagery in accordance with one or more example embodiments of the present disclosure;

FIG. 3 is another flowchart illustrating operations performed, such as by the apparatus of FIG. 1, in order to extract geographic data for buildings in satellite imagery in accordance with one or more example embodiments of the present disclosure;

FIG. 4 illustrates an example location extraction process and an example shape estimation process in accordance with one or more example embodiments of the present disclosure;

FIG. 5 illustrates an example deep learning network in accordance with one or more example embodiments of the present disclosure;

FIG. 6 illustrates an example rasterized pattern and an example line segment in accordance with one or more example embodiments of the present disclosure;

FIG. 7 illustrates an example raw contour in accordance with one or more example embodiments of the present disclosure;

FIG. 8 illustrates merging of two or more line segments in accordance with one or more example embodiments of the present disclosure;

FIG. 9 illustrates an example contour refinement process in accordance with one or more example embodiments of the present disclosure;

FIG. 10 illustrates connecting line segments in accordance with one or more example embodiments of the present disclosure;

FIG. 11 illustrates an example shape estimation process in accordance with one or more example embodiments of the present disclosure;

FIG. 12 illustrates an example active learning process in accordance with one or more example embodiments of the present disclosure; and FIG. 13 illustrates a machine learning model in accordance with one or more example embodiments of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention can be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms can be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment in order to extract geographic data for buildings in satellite imagery. For instance, two-dimensional (2D) building footprints for buildings can be extracted from satellite imagery. The geographic data (e.g., the 2D building footprints) can be extracted from the satellite imagery using one or more image processing techniques. In certain embodiments, one or more image processing techniques can employ one or more deep learning techniques to facilitate image processing with respect to the satellite imagery. The one or more image processing techniques can be automated (e.g., fully automated) to accurately and/or efficiently reduce an amount of manual labor for extracting the geographic data from the satellite imagery.

In an embodiment, the satellite imagery can be provided as input to a building footprint extraction framework. Based on the satellite imagery, the 2D building footprints for the buildings can be extracted and respective geographic coordinates associated with the 2D building footprints can be determined. The geographic coordinates can be provided, for example, to a database for storage and/or to facilitate further employment of the geographic coordinates by one or more computing systems.

In another embodiment, active learning can be employed in a training process to generate a machine learning model for image segmentation. A deep learning network (e.g., a convolutional neural network) associated with the machine learning model can be further employed for an image segmentation process to locate buildings in the satellite imagery.

Furthermore, postprocessing or building shape estimation can be performed on a segmentation map provided by the deep learning network. In this embodiment, one or more computer-vision techniques can be employed in a postprocessing stage for building shape estimation. The postprocessing can separate conflated buildings associated with the segmentation map based on a watershed segmentation technique. A segmentation mask for the segmentation map can also be provided to provide binary indicators for locations of the buildings. The segmentation mask can be divided into raw contours (e.g., raw shapes) that represent raw footprints for the buildings. Additionally, the raw contours can be transformed into refined contours for the building based on one or more line segment detection techniques. The refined contours can correspond to 2D building footprints for the buildings.

In certain embodiments, a segmentation map can be generated by performing an image segmentation on satellite imagery depicting at least one building. A plurality of line segments that correspond to edges of the at least one building can also be generated. Furthermore, for each of the at least one building, a line segment that defines a principal direction of the respective building can be identified. Additionally, a contour for each of at least one building can be generated by filtering and/or selecting line segments corresponding to the at least one building based on the respective principal direction. Geographic data for each of at least one building can therefore be extracted using the respective contour.

In certain embodiments, a raw segmentation map can be generated from satellite imagery by applying a trained machine learning model to the satellite imagery. In certain embodiments, a refined segmentation map (e.g., a binary mask) can be generated by augmenting the raw segmentation map (e.g., obtaining a foreground mask using a watershed technique), by splitting a foreground to separate buildings, and/or by splitting buildings.

In certain embodiments, raw building contours can be generated from the refined segmentation map (e.g., the binary mask) by finding building regions in the refined mask, detecting edges of the building regions, producing line segments that correspond to the edges, obtaining the direction of a longest line segment and setting the longest line segment as a principal direction, using the principal direction to rotate building(s) (e.g., rotate line segments of one or more buildings), filtering line segments (e.g., using a 6×6 filter and according to confidence areas), and/or generating raw building contours from the filtered segments and rotating the building back to an original orientation.

In certain embodiments, refined building contours can be generated from raw building contours by removing rasterized patterns from the raw building contours, clustering line segments of the raster-free contours (e.g., using orientation of the segments), merging clustered line segments (e.g., based on proximity criteria to facilitate the merging of line segments), selecting a principal cluster (e.g., based on length and/or orientation of line segments), rotating line segments to a direction of a principal cluster, and/or connecting line segments (e.g., by extending line segments to fill one or more gaps between line segments).

With reference to FIG. 1, a system 100 configured to provide for accurate and efficient extraction of geographic data for buildings in satellite imagery is depicted, in accordance with one or more embodiments of the present disclosure. In the illustrated embodiment, the system 100 includes an apparatus 102 and a database 104. As described further below, the apparatus 102 is configured in accordance with an example embodiment of the present disclosure to extract geographic data for buildings in satellite imagery. The apparatus 102 can be embodied by any of a wide variety of computing devices including, for example, a server, a distributed network of computing devices, an image processing system, a navigation system, a mapping system, a computer workstation, a personal computer or any other type of computing device. Regardless of the type of computing device that embodies the apparatus 102, the apparatus 102 of an example embodiment includes, is associated with or otherwise is in communication with processing circuitry 106, memory 108 and optionally a communication interface 110.

In some embodiments, the processing circuitry 106 (and/or co-processors or any other processors assisting or otherwise associated with the processing circuitry 106) can be in communication with the memory 108 via a bus for passing information among components of the apparatus 102. The memory 108 can be non-transitory and can include, for example, one or more volatile and/or non-volatile memories. In other words, for example, the memory 108 be an electronic storage device (for example, a computer readable storage medium) comprising gates configured to store data (for example, bits) that can be retrievable by a machine (for example, a computing device like the processing circuitry 106). The memory 108 can be configured to store information, data, content, applications, instructions, or the like for enabling the apparatus 100 to carry out various functions in accordance with an example embodiment of the present invention. For example, the memory 108 can be configured to buffer input data for processing by the processing circuitry 106. Additionally or alternatively, the memory 108 can be configured to store instructions for execution by the processing circuitry 106.

The processing circuitry 106 can be embodied in a number of different ways. For example, the processing circuitry 106 be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry 106 can include one or more processing cores configured to perform independently. A multi-core processor can enable multiprocessing within a single physical package. Additionally or alternatively, the processing circuitry 106 can include one or more processors configured in tandem via the bus to enable independent execution of instructions, pipelining and/or multithreading.

In an example embodiment, the processing circuitry 106 can be configured to execute instructions stored in the memory 108 or otherwise accessible to the processing circuitry 106. Alternatively or additionally, the processing circuitry 106 can be configured to execute hard coded functionality. As such, whether configured by hardware or software methods, or by a combination thereof, the processing circuitry 106 can represent an entity (for example, physically embodied in circuitry) capable of performing operations according to an embodiment of the present invention while configured accordingly. Thus, for example, when the processing circuitry 106 is embodied as an ASIC, FPGA or the like, the processing circuitry 106 can be specifically configured hardware for conducting the operations described herein. Alternatively, as another example, when the processing circuitry 106 is embodied as an executor of software instructions, the instructions can specifically configure the processing circuitry 106 to perform the algorithms and/or operations described herein when the instructions are executed. However, in some cases, the processing circuitry 106 can be a processor of a specific device (for example, a computing device) configured to employ an embodiment of the present invention by further configuration of the processor by instructions for performing the algorithms and/or operations described herein. The processing circuitry 106 can include, among other things, a clock, an arithmetic logic unit (ALU) and/or one or more logic gates configured to support operation of the processing circuitry 106.

The apparatus 102 of an example embodiment can also optionally include the communication interface 110 that can be any means such as a device or circuitry embodied in either hardware or a combination of hardware and software that is configured to receive and/or transmit data from/to other electronic devices in communication with the apparatus 102, such as the database 104 that stores data (e.g., geographic data, building footprint data, etc.) generated and/or employed by the processing circuitry 106. Additionally or alternatively, the communication interface 110 can be configured to communicate in accordance with various wireless protocols including Global System for Mobile Communications (GSM), such as but not limited to Long Term Evolution (LTE). In this regard, the communication interface 110 can include, for example, an antenna (or multiple antennas) and supporting hardware and/or software for enabling communications with a wireless communication network. Additionally or alternatively, the communication interface 110 can include circuitry for interacting with the antenna(s) to cause transmission of signals via the antenna(s) or to handle receipt of signals received via the antenna(s).

FIG. 2 illustrates a flowchart depicting a method 200 according to an example embodiment of the present invention. It will be understood that each block of the flowchart and combination of blocks in the flowchart can be implemented by various means, such as hardware, firmware, processor, circuitry, and/or other communication devices associated with execution of software including one or more computer program instructions. For example, one or more of the procedures described above can be embodied by computer program instructions. In this regard, the computer program instructions which embody the procedures described above can be stored, for example, by the memory 108 of the apparatus 102 employing an embodiment of the present invention and executed by the processing circuitry 106. As will be appreciated, any such computer program instructions can be loaded onto a computer or other programmable apparatus (for example, hardware) to produce a machine, such that the resulting computer or other programmable apparatus implements the functions specified in the flowchart blocks. These computer program instructions can also be stored in a computer-readable memory that can direct a computer or other programmable apparatus to function in a particular manner, such that the instructions stored in the computer-readable memory produce an article of manufacture the execution of which implements the function specified in the flowchart blocks. The computer program instructions can also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Referring now to FIG. 2, the operations performed, such as by the apparatus 102 of FIG. 1, in order to extract geographic data for buildings in satellite imagery is depicted, in accordance with one or more embodiments of the present disclosure. As shown in block 202 of FIG. 2, the apparatus 102 includes means, such as the processing circuitry 106, the memory 108, or the like, configured to generate a segmentation map by performing an image segmentation on satellite imagery depicting at least one building. The satellite imagery can be one or more images (e.g., one or more aerial images) captured by one or more imaging satellites. For example, an imaging satellite can include one or more imaging sensors that can employ remote sensing to obtain at least a portion of the satellite imagery. The one or more imaging satellites can be, for example, in orbit around Earth to facilitate capturing at least a portion of the satellite imagery. In an embodiment, the satellite imagery can be orthorectified satellite imagery that comprises a set of pixels arranged according to respective position coordinates (e.g., an X coordinate and a Y coordinate) with respect to a ground plane. Furthermore, the satellite imagery (e.g., the orthorectified satellite imagery) can be a processed version of raw satellite imagery captured by the one or more imaging sensors to account for optical distortion associated with the one or more imaging sensors and/or the raw satellite imagery.

The image segmentation can be a process that partitions the satellite imagery into multiple segments associated with respective locations for buildings in the satellite imagery. An example of the image segmentation to generate the segmentation map is depicted in FIG. 4. As shown in FIG. 4, satellite imagery 404 is provided to the apparatus 102, such as the processing circuitry 106, to perform image segmentation 410. In certain embodiments, the apparatus 102, such as the processing circuitry 106, can include a deep learning network configured to implement a deep learning process to perform the image segmentation 410. For example, as shown in FIG. 5, the satellite imagery 404 can be provided to a deep learning network 504 to generate a segmentation map 502. The deep learning network 504 can be, for example, a convolutional neural network that employs one or more machine learning techniques to generate the segmentation map 502. In an embodiment, the deep learning network 504 can include an encoder associated with deep learning convolution, a plurality of convolutional layers and/or image pooling. The deep learning network 504 can additionally include a decoder associated with convolutional layers, upsampling, downsampling and/or concatenation. In an aspect, low-level features determined by the encoder can be provided to the decoder to facilitate generation of the segmentation map 502.

The segmentation map 502 can be a partitioned version of the satellite imagery 404 as a result of the image segmentation 410. For example, the segmentation map 502 can indicate which pixels correspond to a location of a building. In certain embodiments, a segmentation map refinement process 412 can be performed by the apparatus 102, such as the processing circuitry 106, following the image segmentation 410. For instance, the segmentation map refinement process 412 can refine the segmentation map 502 to facilitate improved image segmentation (e.g., to facilitate identifying large buildings and/or conflated buildings, etc.). In an aspect, the segmentation map 502 provided to the segmentation map refinement process 412 can be a raw segmentation map. Furthermore, the segmentation map refinement process 412 can generate a processed segmentation map by refining the segmentation map 502. The processed segmentation map provided by the segmentation map refinement process 412 can be a transformed version of the segmentation map 502. For instance, the processed segmentation map provided by the segmentation map refinement process 412 can include binary masks of buildings. Accordingly, the segmentation map 502 can be refined to generate a binary mask associated with the location for each of the at least one building in the satellite imagery 404.

In an embodiment, the segmentation map refinement process 412 implemented by the apparatus 102, such as the processing circuitry 106, can perform an augment segmentation map process, a foreground split process and/or a split variation process. The augment segmentation map process can generate a foreground mask of the segmentation map 502. The augment segmentation map process can employ a set of thresholds for watershed image processing of the segmentation map 502 to generate the foreground mask. The watershed image processing of the augment segmentation map process can be, for example, a watershed image processing technique that fills in low confidence regions of the segmentation map, such as regions of the segmentation map having a confidence level less than a predefined threshold and/or a predefined percentage of the regions having low confidence, to connect the low confidence regions to high confidence regions. As such, holes in the segmentation map 502 (e.g., holes associated with large buildings) can be filled in, such as by interpolation, to facilitate improved detection of entire buildings.

The foreground split process can generate a different foreground mask of the segmentation map 502. For instance, the foreground split process can employ a different set of thresholds (e.g., a set of thresholds that is different than the set of thresholds associated with the augment segmentation map process) for watershed image processing of the segmentation map 502 to generate the different foreground mask. The one or more thresholds from the different set of thresholds can be higher, for example, than respective thresholds from the set of thresholds associated with the augment segmentation map process. In an aspect, the foreground split process can employ the foreground mask associated with the augment segmentation map process to identify each separate building in the segmentation map 502. The foreground split process can be employed, for example, to separate one or more buildings in the segmentation map 502. For example, the foreground split process can locate connection boundaries between buildings to facilitate detection of individual buildings in the segmentation map 502.

The split validation process can dilate boundaries between the buildings and/or can calculate a mean segmentation map value within connecting boundaries to facilitate separating one or more buildings in the segmentation map 502. In an example, a split operation can be performed in response to a determination that a connection boundary is associated with a low confidence score. In an embodiment, the image segmentation 410 and/or the segmentation map refinement process 412 can be included in a location extraction process 406 associated with the satellite imagery 404.

As shown in block 204 of FIG. 2, the apparatus 102 also includes means, such as the processing circuitry 106, the memory 108, or the like, configured to generate a plurality of line segments that correspond to edges of the at least one building. Additionally, as shown in block 205 of FIG. 2, the apparatus 102 also includes means, such as the processing circuitry 106, the memory 108, or the like, configured to, for each of the at least one building, identify a line segment that defines a principal direction of the respective building. In an aspect, the line segment can be identified based on one or more line segment detection techniques. For instance, in an embodiment, a building boundary region can be identified in the segmentation map. The building boundary region can include the plurality of line segments that correspond to the edges of the at least one building. In another aspect, the line segment can additionally or alternatively be identified based on a maximum length of the plurality of line segments. The building boundary region can be identified by configuring the apparatus 102, such as the processing circuitry 106, to apply, for example, an erode and dilate image processing operation on pixel regions of the segmentation map that correspond to locations of buildings. The erode and dilate image processing operation can add one or more pixels associated with boundaries of buildings in the segmentation map. Additionally or alternatively, the erode and dilate image processing operation can remove one or more pixels associated with boundaries of buildings in the segmentation map. Furthermore, the building boundary region can be identified by configuring the apparatus 102, such as the processing circuitry 106, to detect edges of the building boundary region. The apparatus 102, such as the processing circuitry 106, can also be configured as a line segment detector to extract line segments in the building boundary region. In an aspect, the line segment detector can generate a level-line field associated with the segmentation. The level-line field can be a vector field that indicates a direction of alignment (e.g., an angle) for respective line segments. A line segment can be a straight contour or an approximately straight contour of a certain length that defines at least a portion of an edge of the building boundary region. Moreover, the apparatus 102, such as the processing circuitry 106, can determine the line segment associated with the principal direction of the at least one building from the line segments associated with the edges of the building boundary region. For example, the line segment associated with the principal direction of the at least one building can be a line segment with a longest length from the line segments associated with the edges of the building boundary region.

To facilitate extraction of geographic data for each of the at least one building, the apparatus 102 includes means, such as the processing circuitry 106, the memory 108, or the like, configured to generate a contour for each of the at least one building by filtering line segments corresponding to the at least one building based on the respective principal direction of the at least one building. (See block 206 of FIG. 2). The contour for each of the at least one building can be, for example, a shape (e.g., a building footprint shape) of the at least one building. As depicted in FIG. 4, a shape estimation process 408 can be performed by the apparatus 102, such as the processing circuitry 106, to facilitate generation of the contour for each of the at least one building. The shape estimation process 408 can include a raw contour estimation process 414 that estimates raw contours of buildings. Additionally or alternatively, the shape estimation process 408 can include a contour refinement process 416 to refine the contours of the buildings. In an embodiment, via the raw contour estimation process 414, an image (e.g., the segmentation map) of the at least one building can be rotated based on the principal direction of the at least one building to provide a rotated version of the image of the at least one building. For example, the raw contour estimation process 414 can be performed by the apparatus 102, such as the processing circuitry 106, to rotate an image of the at least one building such that the principal direction of the at least one building is aligned with a predefined direction, such as an approximate vertical direction, to provide a rotated version of the image of the at least one building. The raw contour estimation process 414 can also employ a filter, in certain embodiments, to remove low confidence areas (e.g., areas that are not associated with the contour) from the image, such as by filtering pixels having a confidence level that is less than a predefined threshold. For instance, in a non-limiting example, the raw contour estimation process 414 can employ a 6×6 filter with 36 weighted pixels for filtering of the image (e.g., the segmentation map). In an aspect, the filter can be associated with a probability distribution that set respective weights for the weighted pixels. Furthermore, a raw contour for each of the at least one building can be located in the rotated version of the image of the at least one building. In response to locating the raw contour for each of the at least one building, the image (e.g., the segmentation map) of the at least one building can be rotated based on the principal direction of the at least one building to provide the original version of the image (e.g., the non-rotated version) of the at least one building.

Additionally, the raw contour for each of the at least one building can be refined via the contour refinement process 416 to generate the contour for each of the at least one building. For example, the raw contour for each of the at least one building can be refined to provide a more accurate shape for the contour for each of the at least one building. In an embodiment, a rasterized pattern associated with the raw contour can be modified to generate a straight line segment. For example, as shown in FIG. 6, a rasterized pattern 602 of the raw contour can be smoothed by the apparatus 102, such as the processing circuitry 106, to create a line segment 604 for the contour associated with the at least one building. In an aspect, the line segment 604 can be a straight line segment that corresponds to an approximate shape of the rasterized pattern. Therefore, a more accurate shape for the contour for each of the at least one building can be provided. In another embodiment, line segments of the raw contour can be clustered by the apparatus 102, such as the processing circuitry 106, based on an angle associated with respective line segments. For instance, the apparatus 102, such as the processing circuitry 106, can determine an angle of respective line segments with respect to the predefined direction, such as the approximate vertical direction. In an embodiment, as shown in FIG. 7, a raw contour 700 includes multiple line segments that correspond to a shape of the at least one building. In an example, a line segment 702, a line segment 704, a line segment 706 and a line segment 708 can be clustered into a cluster group since the line segment 702, the line segment 704, the line segment 706 and the line segment 708 are similarly angled, such as by being within a predefined angular range of one another, to comprise a corresponding direction of alignment. Furthermore, a line segment 710, a line segment 712, a line segment 714 and a line segment 716 can be clustered into a cluster group since the line segment 710, the line segment 712, the line segment 714 and the line segment 716 are similarly angled to comprise a corresponding direction of alignment. As such, line segments of the raw contour 700 can be clustered by the apparatus 102, such as the processing circuitry 106, based on respective directions of alignment associated with the line segments.

In yet another embodiment, line segments of the raw contour can be merged by the apparatus 102, such as the processing circuitry 106, to form main line segments. For example, as shown in FIG. 8, a portion 802 of the raw contour 700 can include a line segment 804, a line segment 806, a line segment 808, a line segment 810, a line segment 812, a line segment 814, a line segment 816, a line segment 818, a line segment 820, and a line segment 822. The portion 802 of the raw contour 700 can be transformed into the portion 802' of the raw contour 700 by merging two or more of the line segments of the portion 802 based on respective angles of the two or more of the line segments and/or proximity of the two or more line segments. For example, the line segment 806, the line segment 808 and the line segment 810 can be merged together to form a line segment 830 since the line segment 806 and the line segment 810 comprise a corresponding angle and are proximate to one another (e.g., separated by the line segment 808). Furthermore, the line segment 814, the line segment 816 and the line segment 818 can be merged together to form a line segment 832 since the line segment 814 and the line segment 818 comprise a corresponding angle and are proximate to one another (e.g., separated by the line segment 816). As such, the portion 802' of the raw contour 700 can include the line segment 804, the line segment 830, the line segment 810, the line segment 832, the line segment 820 and the line segment 822. Furthermore, the portion 802' of the raw contour 700 can include a lower number of line segments than the portion 802 of the raw contour 700.

The line segment 830 and the line segment 832 can be, for example, a principal cluster of line segments for the raw contour 700. A principal cluster of line segments can be, for example, a line segment with a length that is greater than or equal to a predefined length. In certain embodiments, line segments including the main line segments and/or clustered line segments can be sorted by the apparatus 102, such as the processing circuitry 106, based on length. For instance, line segments can be ranked according to length to generate a ranked list of line segments. Furthermore, a certain number of the line segments from the ranked list of line segments (e.g., a top 80% of the line segments) can be selected for the contour. The line segments can also be rotated by the apparatus 102, such as the processing circuitry 106, based on principal directions. A principal direction of a line segment can be, for example, an angle of alignment of the line segment with respect to a predefined angle of alignment. For example, as shown in FIG. 9, a raw contour 902 includes a plurality of line segments that form a predicted shape for a building. One or more line segments of the raw contour 902 can be clustered and/or merged based on corresponding angles (e.g., angles within a predefined range) to form a modified contour 902'. Additionally, a certain number of the line segments of the modified contour 902' can be filtered and/or rotated to form the modified contour 902". For example, one or more line segments from the modified contour 902' can be removed to form the modified contour 902". The one or more line segments removed from the modified contour 902' can be, for example, low confidence areas of the modified contour 902'. In an aspect, the modified contour 902' can include less line segments than the raw contour 902. Furthermore, the modified contour 902" can include less line segments than the modified contour 902'. In yet another embodiment, line segments can be connected by the apparatus 102, such as the processing circuitry 106, to form a finalized contour for each of the at least one building. In an aspect, gaps between line segments and/or overlaps between line segments can be corrected by connecting line segments and/or modifying a length of line segments.

For example, as shown in FIG. 10, a gap 1008 can be located between a line segment 1002 and a line segment 1004. Furthermore, a gap 1010 can be located between the line segment 1004 and a line segment 1006. The gap 1008 and the gap 1010 can be regions without a line segment. As such, the line segment 1002 and the line segment 1004 can be connected by the apparatus 102, such as the processing circuitry 106, based on an intersection point 1012 between the line segment 1002 and the line segment 1004. For instance, a length of the line segment 1002 can be extended until the intersection point 1012 and a length of the line segment 1004 can be extended until the intersection point 1012. The intersection point 1012 can be, for example, a predicted intersection point between the line segment 1002 and the line segment 1004 in a scenario where a length of the line segment 1002 and the line segment 1004 are extended toward one another. Similarly, the line segment 1004 and the line segment 1006 can be connected based on an intersection point 1014 between the line segment 1004 and the line segment 1006. For instance, a length of the line segment 1004 can also be extended until the intersection point 1014 and a length of the line segment 1006 can be extended until the intersection point 1014. The intersection point 1014 can be, for example, a predicted intersection point between the line segment 1004 and the line segment 1006 in a scenario where a length of the line segment 1004 and the line segment 1006 are extended toward one another. In another example as shown in FIG. 10, an overlap can occur between a line segment 1020 and a line segment 1022. In this regard, the line segment 1020 can extend beyond an intersection point 1026 between the line segment 1020 and the line segment 1022. As such, a length of the line segment 1020 can be shortened to correspond to the intersection point 1026 and a length of the line segment 1022 can be extended until the intersection point 1026. The intersection point 1026 can be, for example, a predicted intersection point between the line segment 1020 and the line segment 1022 in a scenario where a length of the line segment 1022 is extended toward the line segment 1020. Similarly, an overlap can occur between the line segment 1022 and a line segment 1024. The line segment 1024 can extend beyond an intersection point 1028 between the line segment 1022 and the line segment 1024. As such, a length of the line segment 1024 can be shortened to correspond to the intersection point 1028 and a length of the line segment 1022 can also be extended until the intersection point 1028. The intersection point 1028 can be, for example, a predicted intersection point between the line segment 1022 and the line segment 1024 in a scenario where a length of the line segment 1022 is extended toward the line segment 1024. According, referring back to FIG. 9, a contour 902''' that represents a finalized contour (e.g., a refined contour) for the building can be provided.

Referring now to FIG. 11, with respect to generation of the contour for each of the at least one building based on the principal direction of the at least one building, a raw contour 1102 is processed by the apparatus 102, such as the processing circuitry 106, to perform the shape estimation process 408 based on a principal direction 1104 of a building 1106 included in a segmentation map 1108. In an aspect, the principal direction 1104 can be determined based on at least a line segment 1110 that satisfies a defined criterion associated with length. For example, the line segment 1110 can be a longest line segment of the raw contour 1102. Furthermore, a direction of alignment of the principal direction 1104 can correspond to a direction of alignment of the line segment 1110. The raw contour 1102 can be processed by the shape estimation process 408 or implemented by the apparatus 102, such as the processing circuitry 106, as disclosed herein to provide a contour 1102' (e.g., a finalized contour, a refined contour, etc.) for the building 1106.

Furthermore, as shown in block 208 of FIG. 2, the apparatus 102 includes means, such as the processing circuitry 106, the memory 108, or the like, configured to extract geographic data for each of the at least one building based on the respective contour. For example, as depicted in FIG. 4, geographic data 402 can be provided as a result of the shape estimation process 408. The geographic data 402 can include building footprint data (e.g., 2D building footprint data) for each of the at least one building. Additionally or alternatively, the geographic data 402 can include geographic coordinates for each of the at least one building. Additionally or alternatively, the geographic data 402 can include one or more non-spatial attributes for each of the at least one building. In certain embodiments, the geographic data 402 can be formatted in a geoJSON format. The geographic data 402 can also be stored in a database such as, for example, the database 104.

FIG. 3 illustrates a flowchart depicting a method 300 according to another example embodiment of the present invention. It will be understood that each block of the flowchart and combination of blocks in the flowchart can be implemented by various means, such as hardware, firmware, processor, circuitry, and/or other communication devices associated with execution of software including one or more computer program instructions. For example, one or more of the procedures described above can be embodied by computer program instructions. In this regard, the computer program instructions which embody the procedures described above can be stored, for example, by the memory 108 of the apparatus 102 employing an embodiment of the present invention and executed by the processing circuitry 106. As will be appreciated, any such computer program instructions can be loaded onto a computer or other programmable apparatus (for example, hardware) to produce a machine, such that the resulting computer or other programmable apparatus implements the functions specified in the flowchart blocks. These computer program instructions can also be stored in a computer-readable memory that can direct a computer or other programmable apparatus to function in a particular manner, such that the instructions stored in the computer-readable memory produce an article of manufacture the execution of which implements the function specified in the flowchart blocks. The computer program instructions can also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Referring now to FIG. 3, the operations performed, such as by the apparatus 102 of FIG. 1, in order to extract geographic data for buildings in satellite imagery is depicted, in accordance with one or more embodiments of the present disclosure. As shown in block 302 of FIG. 3, the apparatus 102 includes means, such as the processing circuitry 106, the memory 108, or the like, configured to generate a segmentation map by performing an image segmentation on satellite imagery depicting at least one building. For instance, an example of the image segmentation to generate the segmentation map is depicted in FIG. 4. As shown in FIG. 4, the satellite imagery 404 is provided for the image segmentation 410. In certain embodiments, the apparatus 102, such as the processing circuitry 106, includes a deep learning network configured to perform a deep learning process in order to provide for the image segmentation 410. For example, as shown in FIG. 5, the satellite imagery 404 can be provided to the deep learning network 504 to generate the segmentation map 502. The deep learning network 504 can be, for example, a convolutional neural network that employs one or more machine learning techniques to generate the segmentation map 502. The segmentation map 502 can be a partitioned version of the satellite imagery 404 as a result of the image segmentation 410. For example, the segmentation map 502 can indicate which pixels correspond to a location of a building.

As shown in block 304 of FIG. 3, the apparatus 102 also includes means, such as the processing circuitry 106, the memory 108, or the like, configured to estimate a raw contour of the at least one building based on the segmentation map. The raw contour for each of the at least one building can be, for example, a predicted shape (e.g., a predicted building footprint shape) of the at least one building. As depicted in FIG. 4, the shape estimation process 408 can be performed by the apparatus 102, such as the processing circuitry 106, to facilitate generation of the raw contour for each of the at least one building. The shape estimation process 408 can include the raw contour estimation process 414 that estimates the raw contour the at least one building.

To facilitate extraction of geographic data for each of the at least one building, the apparatus 102 includes means, such as the processing circuitry 106, the memory 108, or the like, configured to cluster line segments of the raw contour to generate a refined contour for each of the at least one building. (See block 306 of FIG. 3). For example, the raw contour for each of the at least one building can be refined via the contour refinement process 416 of the apparatus 102, such as the processing circuitry 106, to generate the refined contour for each of the at least one building. For example, the raw contour for each of the at least one building can be refined to provide a more accurate shape for the refined contour for each of the at least one building. In an embodiment, line segments of the raw contour can be clustered by the apparatus 102, such as the processing circuitry 106, in accordance with an angle associated with respective line segments such as by clustering line segments within a predefined angular range of one another. For instance, as shown in FIG. 7, the raw contour 700 includes multiple line segments that correspond to a shape of the at least one building. In an example, the line segment 702, the line segment 704, the line segment 706 and the line segment 708 can be clustered into a cluster group since the line segment 702, the line segment 704, the line segment 706 and the line segment 708 are similarly angled to comprise a corresponding direction of alignment. Furthermore, the line segment 710, the line segment 712, the line segment 714 and the line segment 716 can be clustered into a cluster group since the line segment 710, the line segment 712, the line segment 714 and the line segment 716 are similarly angled to comprise a corresponding direction of alignment. In another embodiment, line segments of the raw contour can be merged by the apparatus 102, such as the processing circuitry 106, to form main line segments. For instance, as shown in FIG. 8, the portion 802 of the raw contour 700 can be transformed into the portion 802' of the raw contour 700 by merging two or more of the line segments of the portion 802. In an example, the line segment 806, the line segment 808 and the line segment 810 can be merged together to form the line segment 830 since the line segment 806 and the line segment 810 comprise a corresponding angle and are proximate to one another (e.g., separated by the line segment 808).

Furthermore, as shown in block 308 of FIG. 3, the apparatus 102 includes means, such as the processing circuitry 106, the memory 108, or the like, configured to extract the geographic data for each of the at least one building based on the respective refined contour. For example, as depicted in FIG. 4, geographic data 402 can be provided as a result of the shape estimation process 408 performed by the apparatus 102, such as the processing circuitry 106. The geographic data 402 can include building footprint data (e.g., 2D building footprint data) for each of the at least one building. Additionally or alternatively, the geographic data 402 can include geographic coordinates for each of the at least one building. Additionally or alternatively, the geographic data 402 can include one or more non-spatial attributes for each of the at least one building. In certain embodiments, the geographic data 402 can be formatted in a geoJSON format. The geographic data 402 can also be stored in a database such as, for example, the database 104.

Referring to FIG. 12, a flowchart 1200 configured for performing an active learning process is depicted, in accordance with one or more embodiments of the present disclosure, in order to facilitate the segmentation map refinement process 412 performed by the apparatus 102, such as the processing circuitry 106. In an embodiment, training data 1202 and ground truth labels 1204 can be provided as input to a training process 1206 implemented by the apparatus 102, such as the processing circuitry 106. The training data 1202 can be a set of noisy satellite images and the ground truth labels can be annotations of contours of buildings. The training process 1206 can provide a noisy model 1208 to, for example, select high confidence satellite imagery as input training data for a next iteration of the training process 1206. The noisy model 1208 can be, for example, a noisy machine learning model of building contours that facilitates selection of a subset of satellite imagery as input training data for a next iteration of the training process 1206. For example, at block 1210, the apparatus 102 includes means, such as the processing circuitry 106 or the like, for determining whether training error is less than E, where E is a defined threshold value. The training error can be an amount of error in the noisy model 1208 provided by the training process 1206. If the training error is not less than E, than a machine learning model 1211 that is trained based on the training process 1206 can be provided by the apparatus 102, such as the processing circuitry 106. The machine learning model 1211 can be, for example, a deep learning model for image segmentation related to extracting building footprints from satellite imagery. However, if the training error is not less than E, the apparatus 102 includes means, such as the processing circuitry 106 or the like, for determining inference results on training data at block 1212. Furthermore, as shown in block 1214, the apparatus 102 includes means, such as the processing circuitry 106 or the like, for comparing difference between the inference results (e.g., the inference results determined by block 1212) and the ground truth labels 1204. At block 1216, the apparatus 102 includes means, such as the processing circuitry 106 or the like, for determining whether the difference is less than D, where D is a defined threshold level. If the difference is not less than D, noise data 1218 associated with low confidence images can be discarded. The noise data 1218 can be, for example, a portion of the training data that includes inaccurate image segmentation (e.g., one or more missing building labels, one or more extra building labels, etc.). However, if the difference is less than D, clean data 1220 associated with high confidence images can be provided as input training data for a next iteration of the training process 1206. The clean data 1220 can be, for example, a portion of the training data that includes accurate image segmentation (e.g., accurate building labels).

Referring now to FIG. 13, the machine learning model 1211 can be trained as a result of the training process 1206 to provide improved segmentation maps from satellite imagery. For example, the machine learning model 1211 can generate a segmentation map 1304 with reduced noise based on the satellite imagery 1302.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Furthermore, in some embodiments, additional optional operations can be included. Modifications, additions, or amplifications to the operations above can be performed in any order and in any combination.

Moreover, although the foregoing descriptions and the associated drawings describe example embodiments in the context of certain example combinations of elements and/or functions, it should be appreciated that different combinations of elements and/or functions can be provided by alternative embodiments without departing from the scope of the appended claims. In this regard, for example, different combinations of elements and/or functions than those explicitly described above are also contemplated as can be set forth in some of the appended claims. Although specific terms are employed herein, they are used in a generic and descriptive sense only and not for purposes of limitation.

That which is claimed:

1. A computer-implemented method for extracting building footprints for buildings based on satellite imagery, the method comprising:
   generating a segmentation map by performing an image segmentation on satellite imagery depicting at least one building;
   generating a processed segmentation map by applying a filter to the segmentation map, wherein the filter is associated with a probability distribution;
   generating a plurality of line segments that correspond to edges of the at least one building;
   for each of the at least one building, identifying a line segment that defines a principal direction of the respective building;
   generating a contour for each of the at least one building by filtering line segments corresponding to the at least one building based on the respective principal direction, wherein generating the contour comprises locating a raw contour for each of the at least one building based on the processed segmentation map, and refining the raw contour for each of the at least one building; and
   extracting geographic data for each of the at least one building based on the respective contour.

2. The computer-implemented method of claim 1, wherein the identifying comprises identifying the line segment based on a maximum length of the plurality of line segments.

3. The computer-implemented method of claim 1, wherein the generating the contour of the at least one building comprises:
   rotating an image of the at least one building based on the principal direction of the at least one building to provide a rotated version of the image of the at least one building;
   locating the raw contour for each of the at least one building based on the rotated version of the image of the at least one building; and
   refining the raw contour for each of the at least one building to generate the contour for each of the at least one building.

4. The computer-implemented method of claim 1, wherein the generating the contour for each of the at least one building comprises:
   refining the raw contour for each of the at least one building by removing one or more line segments of the raw contour; and
   connecting one or more other line segments of the raw contour to form the contour for each of the at least one building.

5. The computer-implemented method of claim 1, wherein the generating the contour for each of the at least one building comprises smoothing at least one rasterized pattern from the raw contour for each of the at least one building.

6. The computer-implemented method of claim 1, wherein the generating the contour for each of the at least one building comprises clustering line segments of the raw contour for each of the at least one building based on respective directions of alignment associated with the line segments.

7. The computer-implemented method of claim 1, wherein the generating the contour for each of the at least one building comprises merging two or more line segments of the raw contour for each of the at least one building to generate a principal cluster of the line segments.

8. The computer-implemented method of claim 1, further comprising:
   training a machine learning model for the image segmentation based on a noisy machine learning model of the building contours.

9. The computer-implemented method of claim 1, further comprising:
   refining the segmentation map to generate a binary mask associated with a location for each of the at least one building in the satellite imagery.

10. The computer-implemented method of claim 1, further comprising:
    refining the segmentation map based on a watershed image processing technique to facilitate identification of a location for each of the at least one building.

11. An apparatus configured to extract building footprints for buildings based on satellite imagery, the apparatus comprising processing circuitry and at least one memory including computer program code instructions, the computer program code instructions configured to, when executed by the processing circuitry, cause the apparatus to:
generate a segmentation map by performing an image segmentation on satellite imagery depicting at least one building;
generate a processed segmentation map by applying a filter to the segmentation map wherein the filter is associated with a probability distribution;
generate a plurality of line segments that correspond to edges of the at least one building;
for each of the at least one building, identify a line segment that defines a principal direction of the respective building;
generate a contour for each of the at least one building by filtering line segments corresponding to the at least one building based on the respective principal direction, wherein generating the contour comprises locating a raw contour for each of the at least one building based on the processed segmentation map, and refining the raw contour for each of the at least one building; and
extract geographic data for each of the at least one building based on the respective contour.

12. The apparatus of claim 11, wherein the computer program code instructions are further configured to, when executed by the processing circuitry, cause the apparatus to rotate an image of the at least one building based on the principal direction of the at least one building to provide a rotated version of the image of the at least one building.

13. The apparatus of claim 12, wherein the computer program code instructions are further configured to, when executed by the processing circuitry, cause the apparatus to locate the raw contour for each of the at least one building based on the rotated version of the image of the at least one building.

14. The apparatus of claim 13, wherein the computer program code instructions are further configured to, when executed by the processing circuitry, cause the apparatus to smooth at least one rasterized pattern from the raw contour for each of the at least one building.

15. The apparatus of claim 13, wherein the computer program code instructions are further configured to, when executed by the processing circuitry, cause the apparatus to cluster line segments of the raw contour based on respective directions of alignment associated with the line segments.

16. The apparatus of claim 13, wherein the computer program code instructions are further configured to, when executed by the processing circuitry, cause the apparatus to merge two or more line segments of the raw contour to generate a principal cluster of line segments.

17. A computer-implemented method for extracting building footprints for buildings based on satellite imagery, the method comprising:
generating a segmentation map by performing an image segmentation on satellite imagery depicting at least one building;
generating a processed segmentation map by applying a filter to the segmentation map, wherein the filter is associated with a probability distribution;
estimating a raw contour for each of the at least one building based on the processed segmentation map;
clustering line segments of the raw contour to generate a refined contour for each of the at least one building; and
extracting geographic data for each of the at least one building based on the respective refined contour.

18. The computer-implemented method of claim 17, wherein the clustering the line segments of the raw contour comprises clustering the line segments of the raw contour based on respective directions of alignment associated with the line segments.

19. The computer-implemented method of claim 17, wherein the clustering the line segments of the raw contour comprises merging two or more line segments of the raw contour.

20. A computer-implemented method for extracting building footprints for buildings based on satellite imagery, the method comprising:
generating a segmentation map by applying a machine learning model to satellite imagery depicting at least one building;
generating, using the segmentation map, a plurality of line segments that correspond to edges of the at least one building;
for each of the at least one building, identifying a line segment that defines a principal direction of the respective building;
generating a contour for each of the at least one building by filtering line segments corresponding to the at least one building based on the respective principal direction; and
extracting geographic data for each of the at least one building using the respective contour, wherein the machine learning model for the image segmentation is trained using a noisy machine learning model of the contour for each of the at least one building.

* * * * *